June 4, 1935. W. D. ARCHEA ET AL 2,003,572
MILLING MACHINE
Filed Oct. 21, 1930 10 Sheets-Sheet 1

Inventors
WALTER D. ARCHEA
MILLARD ROMAINE
By H. K. Parsons
Attorney

June 4, 1935.  W. D. ARCHEA ET AL  2,003,572
MILLING MACHINE
Filed Oct. 21, 1930  10 Sheets-Sheet 5

Inventors
WALTER D. ARCHEA
MILLARD ROMAINE
By A. H. Parsons
Attorney

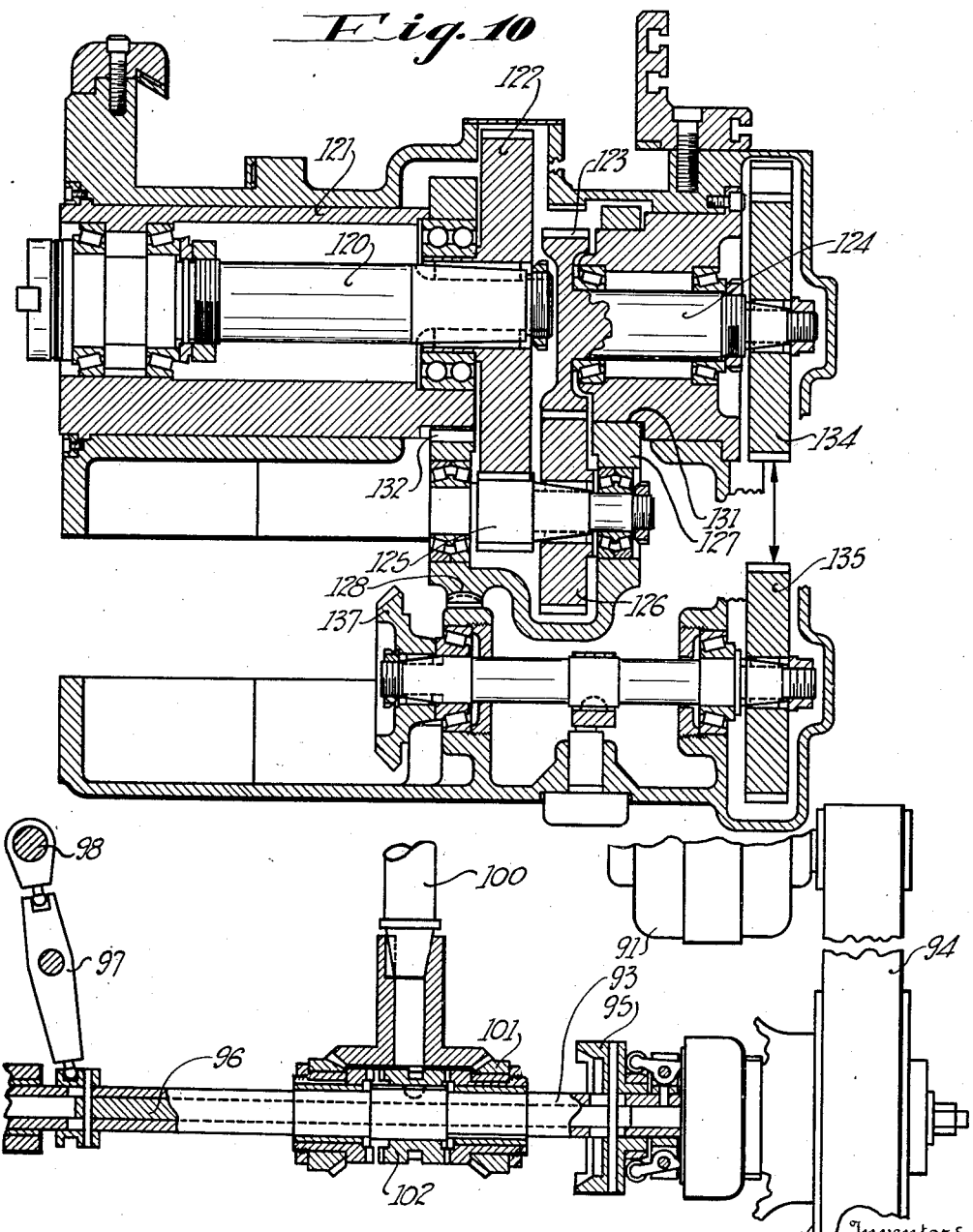

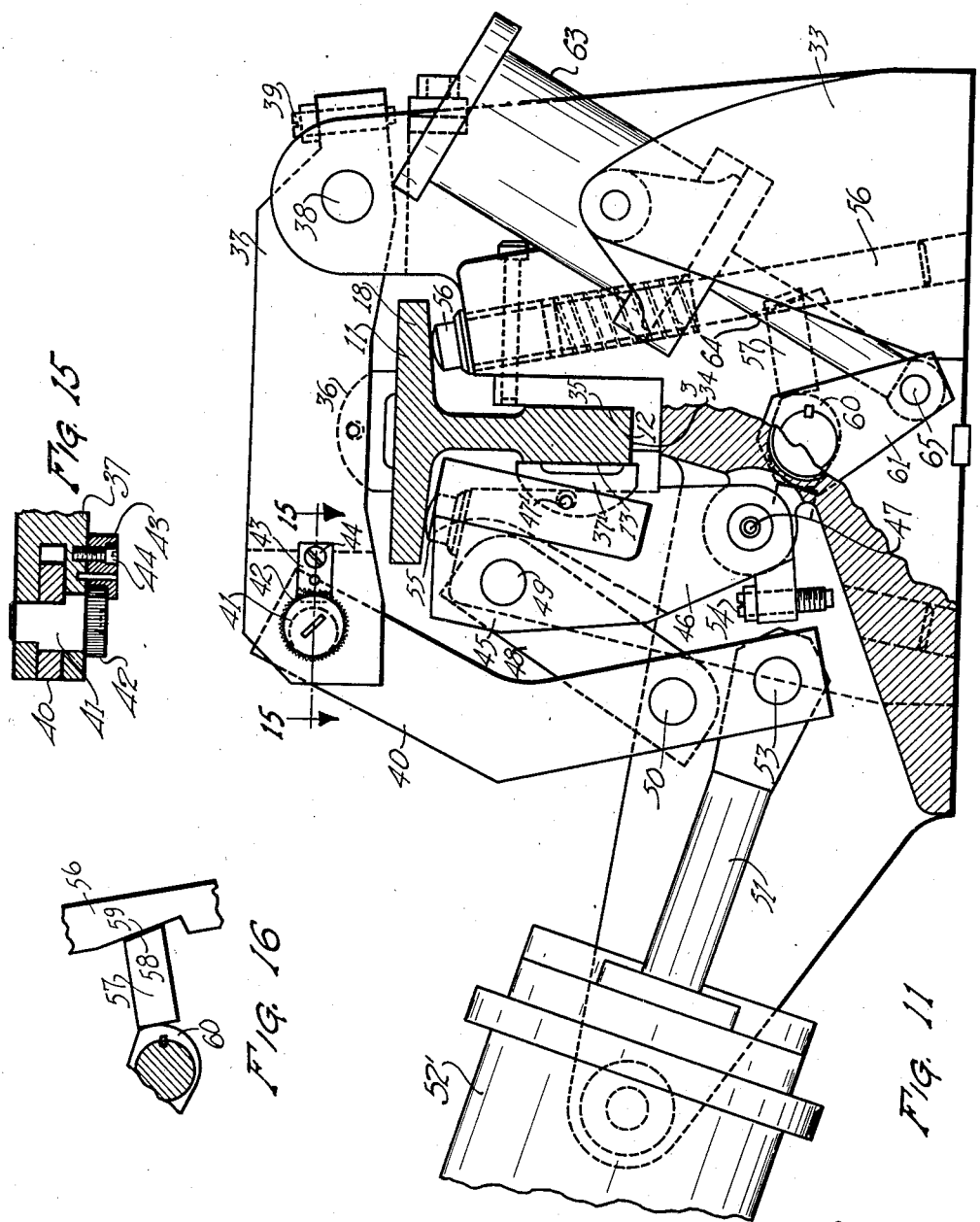

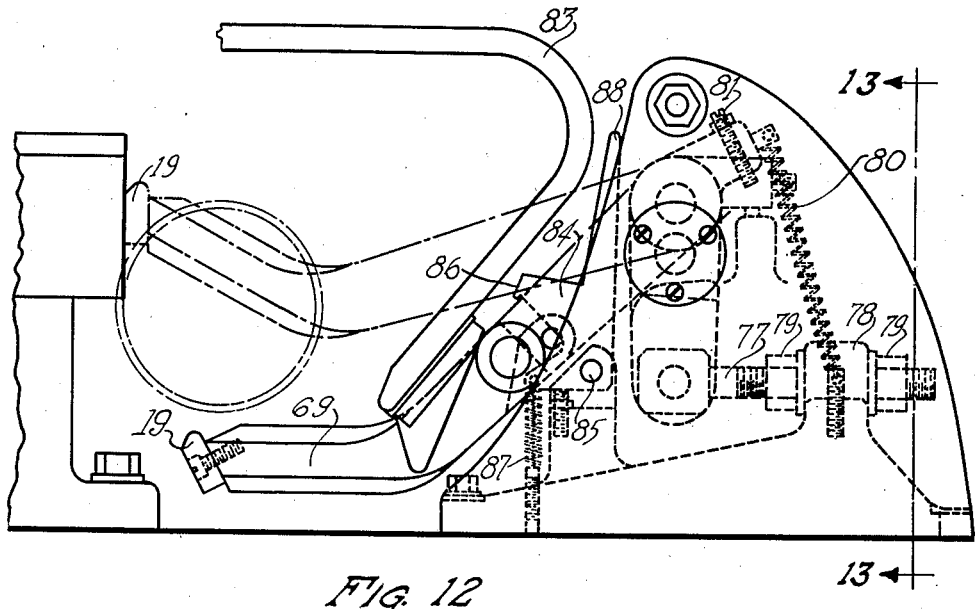

June 4, 1935.　　　W. D. ARCHEA ET AL　　　2,003,572
MILLING MACHINE
Filed Oct. 21, 1930　　10 Sheets-Sheet 9
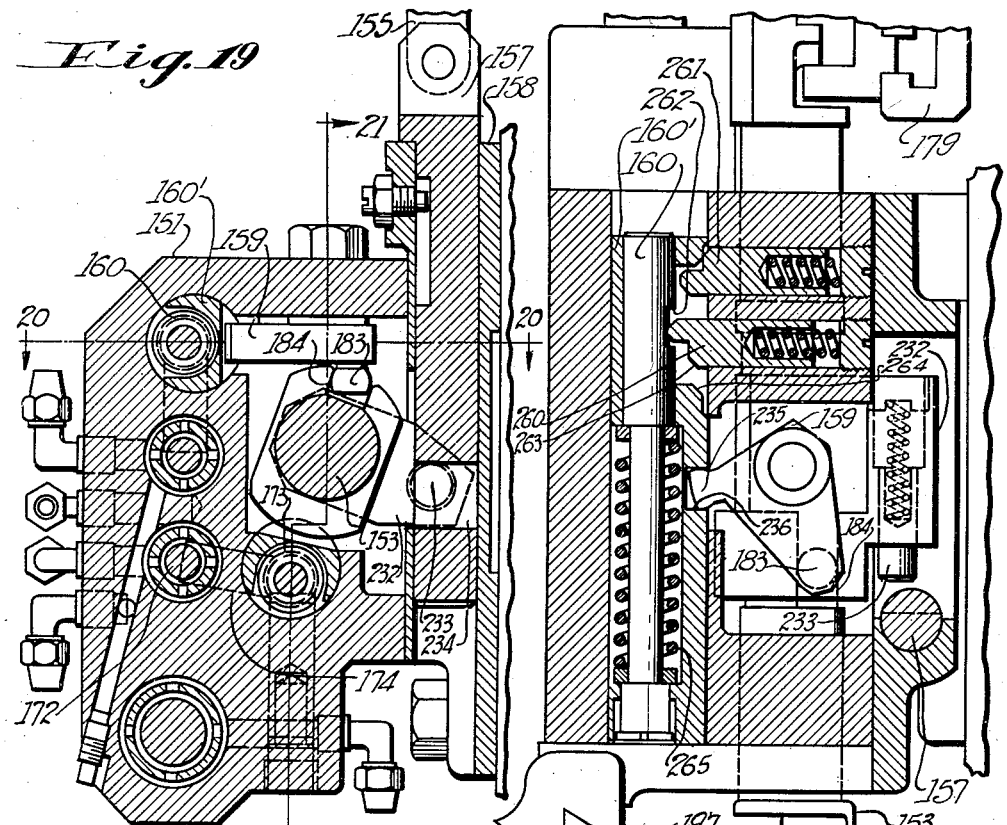
Fig. 19
Fig. 20
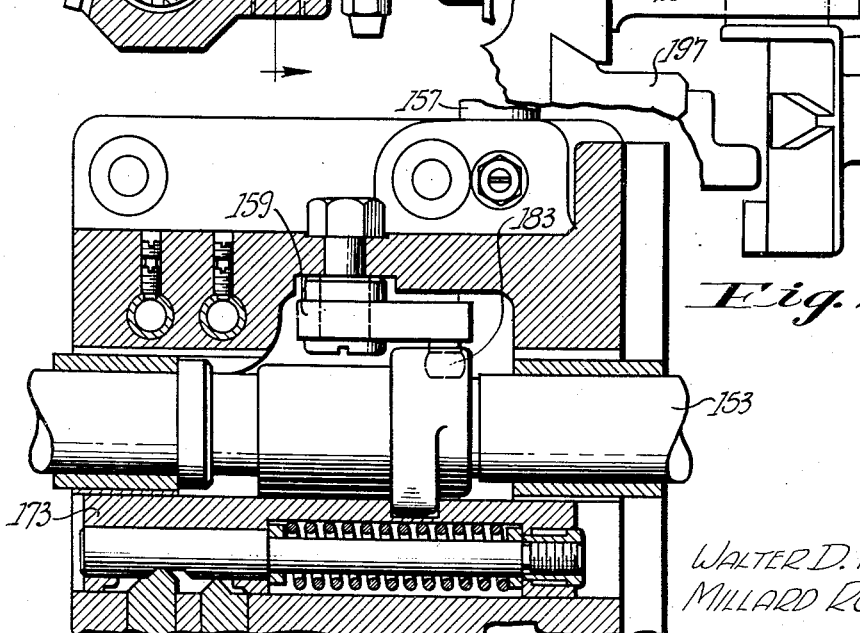
Fig. 21
Inventors
WALTER D. ARCHEA
MILLARD ROMAINE
By H. K. Parsons
Attorney

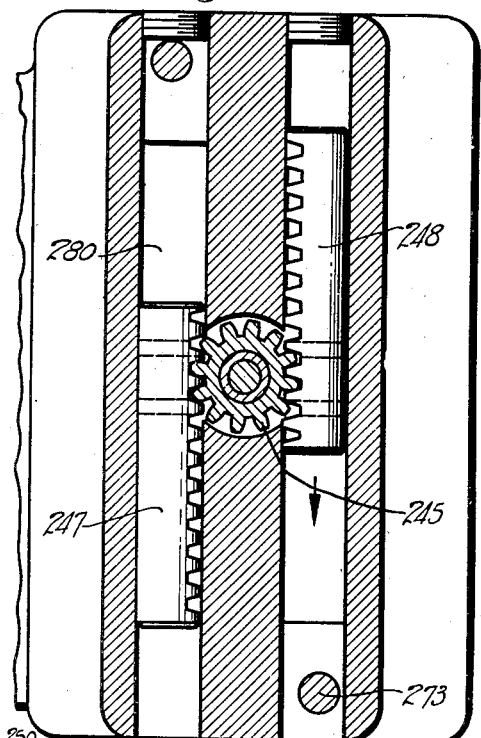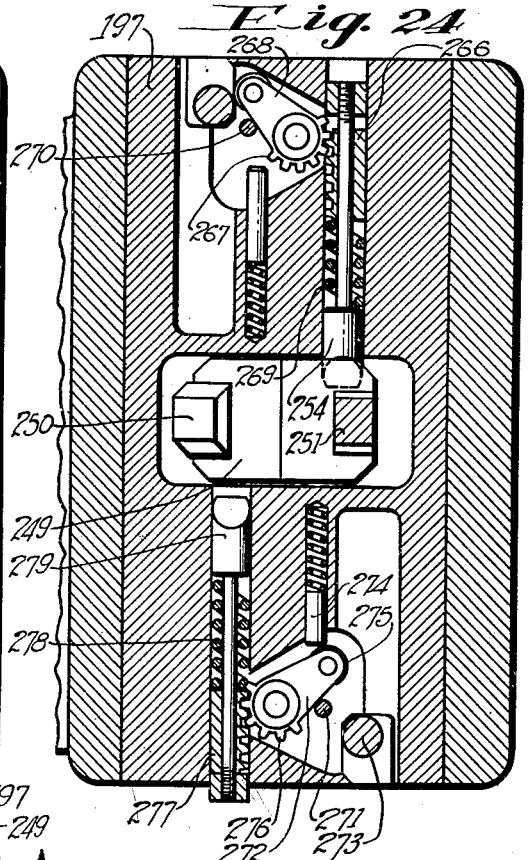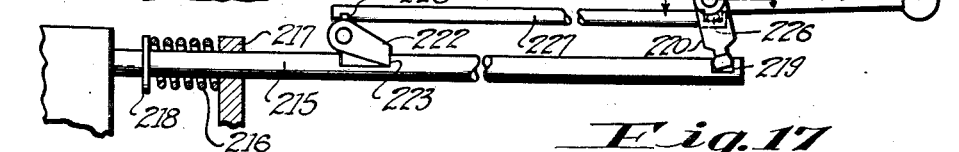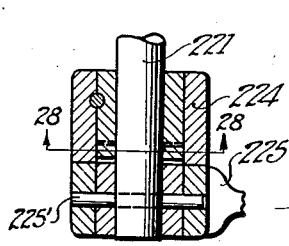

Patented June 4, 1935.

2,003,572

UNITED STATES PATENT OFFICE 2,003,572

MILLING MACHINE

Walter D. Archea and Millard Romaine, Cincinnati, Ohio, assignors to The Cincinnati Milling Machine Company, Cincinnati, Ohio, a corporation of Ohio Application October 21, 1930, Serial No. 490,248

57 Claims. (Cl. 90—15)

This invention relates to a machine tool organization and more particularly to a compound milling machine.

In the machining of many articles of manufacture it often become necessary to finish a plurality of surfaces thereon which are in such relation as to prevent the application of ordinary production methods to their fabrication. More particularly is this true where the surfaces to be finished are adjacent and the nature of the tooling operations is such as to prevent their simultaneous accomplishment without interference. This, of necessity, causes each operation to be performed separately, thereby hindering production and adding to the cost of the product.

It is, therefore, one of the principal objects of this invention to provide an improved hydraulically actuated production machine in which a plurality of tooling operations, not subject to simultaneous performance, may be accomplished in rapid succession in a single automatic cycle.

Another object of this invention is the provision of a machine tool having multiple slides and a single unit for selectively determining the actuation of each.

A further object of this invention is to provide in a milling machine having a plurality of movable slides, improved automatic control means for initiating the movement of any slide from the other whereby the slides may be translated automatically in predetermined succession during each cycle of the machine.

A still further object of this invention is to provide a compound milling machine composed of spaced independent milling units with suitable controls whereby each unit may be simultaneously started on its cycle but individually controlled thereafter.

An additional object of this invention is to provide improved unitary control means to effect clamping of the work holders of a plurality of machine tool units and simultaneously therewith starting each unit upon its cycle of operation.

Other objects and advantages of the present invention should be readily apparent by reference to the following specification considered in conjunction with the accompanying drawings illustrative of one embodiment thereof, but it will be understood that any modifications may be made in the specific structural details hereinafter disclosed, within the scope of the appended claims, without departing from or exceeding the spirit of the invention.

Referring to the drawings in which like reference numerals indicate like parts:

Figure 3 is a diagram of the general control system for the work fixtures, transfer table and cycle initiating mechanism.

Figure 10 is an expanded view of the transmission gearing to the eccentrically adjustable spindle quill.

Figure 11 is a detail of one of the work holders.

Figure 12 is an elevation of the work stop or positioning mechanism.

Figure 13 is a view taken on the line 13—13 of Figure 12.

Figure 14 is a vertical section through one of the elevating cylinders for the transfer table.

Figure 15 is a detail section on the line 15—15 of Figure 11.

Figure 16 is a detail view of the locking pin for the work holder plunger.

Figure 17 is a detail of the dual control for the stop valve.

Figure 18 is a view of the general transmission for the cutter spindles of one unit.

Figure 19 is a section through the pilot valve as on the line 19—19 of Figure 7.

Figure 20 is a detail section taken on the line 20—20 of Figure 19.

Figure 21 is a section on the line 21—21 of Figure 19.

Figure 22 is a section through the prepositioning control slide as viewed on the line 22—22 of Figure 7.

Figure 23 is a section on the line 23—23 of Figure 22.

Figure 24 is a section on the line 24—24 of Figure 22.

Figure 25 is a detail section on the line 25—25 of Figure 17.

Figure 26 is a detail, partly in section, showing the slide actuating cylinders as viewed on the line 26—26 of Figure 2.

Figure 27 is a diagram of the connections to the selector valve in feed position.

Figure 28 is a section on line 28—28 of Figure 25.

Figure 1:
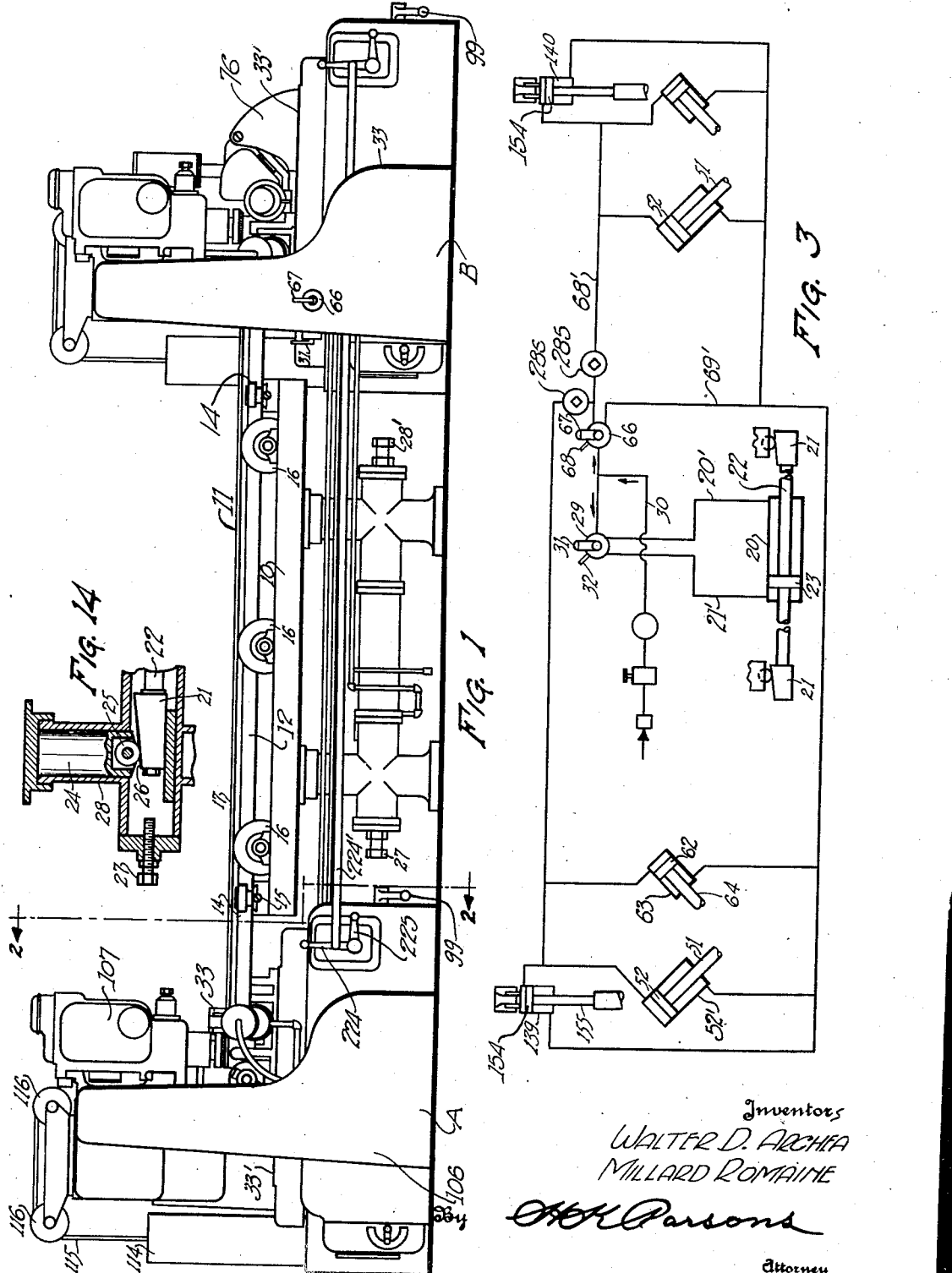
Figure 1 is an elevation of a machine embodying the principles of this invention.

It is thought that the description of the machine will be better understood if a brief outline of one cycle of operation that may be carried out on the machine is first set forth. The machine in general comprises two separate milling units with a transfer table interposed between units for supporting work to be operated upon by the cutters of each unit. The work is moved longitudinally into the machine onto the transfer table and moved therealong into engagement with positioning means for locating the work with respect to the cutters after which the table is lowered to transfer the work into the work holders of each unit where it is securely held during the machining operation.

Each unit has a horizontal and a vertical cutter, each cutter being mounted on a carrier for independent movement. The machining of each end of the work piece is carried out in a single automatic cycle, the horizontal cutter moving down first to mill the end face of the work after which it stops and remains in a lowered position. Just before stopping it automatically trips into operation the vertical cutter which moves laterally to mill a portion of the top surface of the work and then returns to its starting position. Just before completing this movement, it in turn automatically trips into operation the horizontal cutter which returns to its starting position. The work piece is then removed from the machine and a new piece substituted. This cycle of operation is carried out on each unit substantially simultaneously but by independent power means.

*Transfer table*

The transfer table 10 is interposed between the two milling units A and B which are spaced apart a distance determined by the length of the longest work piece to be handled in the machine and serves to receive and transfer work to the work holders of each unit. The transfer table has a plurality of rollers 16 spaced therealong upon which the work is received and rolled into the machine, and, in addition, has mounted at each end a pair of guide rollers 14. The work in the present instance comprises elevator guide rails 11, and these rails have prefinished surfaces 12 and 13, as shown in Figure 11, which are engaged by the guide rollers to laterally position the work as it enters the machine. For this purpose the guide rollers are laterally adjustable, as by means of the adjusting screw 15. The flanges 17 of the rail are utilized to support it on the rollers 16 upon which it moves into engagement with the stop 19, shown in Figure 12. This stop positions the work longitudinally with respect to the cutters in each unit after which the work is lowered into the work holders.

The means for raising and lowering the table 10 comprises a pair of cams 21, as shown in Figures 3 and 14, which are secured to opposite ends of the piston rod 22. This rod has a piston 23 intermediate the length thereof which is slidably mounted in the cylinder 20. A pair of reciprocable plungers, one of which is shown at 24 in Figure 14, depend from the under side of the transfer table and are slidably received in cylinders 28, each plunger having a roller 25 journaled in its lower end for engaging the inclined surface 26 of the cam 21. It will be noted that the inclined surface of each cam extends in the same direction so that upon movement of the piston 23 to the left, the plungers 24 and thereby the table will be elevated and upon movement to the right, the table will be lowered. For the purpose of limiting the movement of the table a stop, such as 27, is provided in the end of the housing 28 for engaging one end of the piston rod 22 and limiting its movement to the left thereby establishing the height to which the transfer table will be elevated. A second stop 28' is provided for engaging the opposite end of the piston rod to limit its downward movement to the extent that the work will just rest in the bottom of the work holders.

The piston 23 is actuated by fluid pressure, which may be from any suitable source and conducted through the channel 30 to the control valve 29 located on the side of the column 33 of the unit B. Conduits 20' and 21' ported in the control valve serve to connect the valve with the opposite ends of the cylinder 20. If compressed air is used, which has been found suitable in the present instance, the control valve 29 may be provided with an exhaust port 32, whereby movement of the valve control handle 31 to the left will connect one end of the cylinder through channel 20' with the pressure channel 30 and the other end of the cylinder, through channel 21' with exhaust 32; and movement to the other position will effect the reverse connection. The transfer table may thus be raised by power means to a position where the work may be rolled onto it without interfering with the work fixtures and along it into engagement with positioning means to properly locate it with respect to the cutters. The table is then lowered gradually to transfer the work to the work fixtures of each unit and after the machining operation has been completed, is elevated again to remove the work from the fixtures so that it may be rolled from the machine without interference therewith.

*Work fixtures*

Each unit is provided with work holding fixtures which are similar in construction and, therefore, a description of one is thought to suffice for both. Referring to Figures 2, 11, 15 and 16, the work holder comprises a base 33 which is attached to a platen 33' provided with each unit and has detachably affixed thereon the hardened guide surfaces 34 and 35 against which the work piece is guided and clamped. These guide surfaces may be formed to any suitable contour that will best accommodate the sectional profile of the work to be finished. The work is held in contact with the surface 34 by the equalizing clamp member 36 and against the surface 35 by the equalizing clamp member 37'. The member 36 is pivoted to the operating lever 37 which is journaled on a pin 38 fixed in the base 33. This lever is provided with an adjustable set screw 39 on the side of the pivot opposite to the clamp member for limiting its upward movement. A link 40 connects the operating lever with the piston rod 51 for operation thereby. For the purpose of varying the clamping pressure of the member 36, the link 40 may be adjusted with respect to the operating lever by means of the adjustable eccentric pin 41. This pin has a serrated head 42 which is engaged by a locking plate 43 secured to the side of the lever by the screw 44. Rotation of the pin will raise or lower the link 40 with respect to the lever and thereby vary the distance between the end of the lever and the end of the piston to increase or decrease the pressure of the clamping member 36.

The clamping member 37' is forced into clamping engagement with the work by means of a modified toggle mechanism, indicated generally by the reference numeral 45, comprising the link 46 pivoted about a fixed center 47 and a link 48 which is pivotally connected at one end to the link 46 by means of the pin 49 and at the other end to the link 40 by means of the pin 50. This last connection makes it possible to operate both clamping members from the piston rod 51 which is integrally connected to the piston 52 slidably mounted in the pivoted cylinder 52'. Since the axis of the pin 53, which connects the link 40 with the piston rod, moves through an arc, due to the toggle mechanism, the cylinder 52' has been pivotally mounted so that the weight of the piston in the remote end of the cylinder when the work holder is unclamped will assist by the aid of gravity to hold the work holder open.

Additional means have been provided for stabilizing the work piece during a cutting operation and comprises a pair of reciprocable plungers 55 and 56 which normally project from their sockets by spring pressure to thereby engage the under side of the work piece as it is lowered into the work fixtures by the transfer table. After the work has been clamped in the fixture the plungers are clamped in whatever position they have assumed due to the irregularity of the under side of the work piece by means of locking members 57, each of which has a wedge shaped face 58, as shown in Figure 16, for engaging the inclined surface 59 formed on the plunger. The locking member 57 is wedged into position by a cam 60 formed integral with the crank arm 61 which is rotated about its center by fluid pressure means, such as the piston 62 slidably mounted in the pivoted cylinder 63 and having a piston rod 64 pivotally secured at 65 to the end of the crank. From this it will be seen that the plungers 55 and 56 are moved downward as determined by the under surface of the work and then are securely locked in that position to prevent any rotative or turning movement of the work during the milling operation.

The operation of the work holder is as follows: assuming the lever 37 is in an elevated position and the toggle mechanism 45 expanded, the end of a work piece held in an elevated position by the transfer table may be received therein. Upon lowering of the transfer table the work engages the plungers 55 and 56 forcing them downward until the work rests on the guide surface 34. Pressure is now simultaneously admitted to both cylinders and the clamping member 37' moves the work against the surface 35 while the clamping member 36 secures the work against the surface 34 and at the same time the plungers 55 and 56 are being locked by the cam 60. Upon release of pressure from the cylinders 52' and 63 the reverse operations take place.

The actuation of the pistons for all the work holders is simultaneously controlled from a single control valve 66 secured to the face of the column 33 of the unit B and connected to pressure by means of the channel 30. This valve has an exhaust port 68 and is connected to one end of the work fixture cylinders through the channel 68' and to the other end through the channel 69'. The valve is further provided with a manual control lever 67 whereby movement in one direction will connect the channel 69' with exhaust port 68 and admit pressure to the channel 68' to thereby effect clamping of all the work fixtures simultaneously and movement of the control lever in the opposite direction will admit pressure to the channel 69' and connect the channel 68' with the exhaust port thereby causing the work fixtures to unclamp the work. It will be noted from Figure 1 that the control levers 31 and 67 are adjacent to one another whereby the operator may, from a single operating station, lower the work into the fixtures, simultaneously clamp both fixtures and release the work therefrom.

Adjustable positioning stop

As shown more particularly in Figures 12 and 13, the stop 19, previously referred to as serving to position the work with respect to the cutters, is secured to the end of the pivoted arm 69 having furcations 70 and 71 secured to the ends 72 and 73 of the forked adjusting member 74 which is pivotally mounted at 75 in the base member 76 secured to the platen of unit B. The member 74 is slotted at its lower end for receiving the pivoted adjusting bolt 77 slidably mounted in a bore in the boss 78 of the base casting. A pair of adjusting nuts 79 are threaded on the bolt upon opposite sides of the boss whereby the bolt may be longitudinally adjusted to vary the position of the center of oscillation 69' of the pivoted arm 69 to thereby adjust or vary the position of the stop member 19. The arm 69 is normally maintained in an elevated position by means of the springs 80 which may be adjusted by the adjustable set screw 81 in the arm 69 engaging a fixed stop 82 of the base casting. The arm is adapted to be moved downward by the member 83 secured to the horizontal spindle carrier of the unit B upon descent of the cutter toward the work. This moves the stop member out of position during the machining operation and also operates a latch member 84 pivoted at 85 to a fixed part of the base member which has a pawl 86 for engaging the arm 69 and holding it in a depressed position after being lowered by the member 83. The latch member also has an upwardly extending finger 88 against which one flange of the work abuts upon its outward movement from the machine for unlatching the pawl against the action of its spring 87 thereby permitting the member 69 to rise again under the action of spring 80. The stop 19 will not immediately return to its former position but will ride against the under surface of the work until the work piece leaves the machine after which it will return again to position the next work piece coming into the machine.

Spindle transmission

Figure 2:
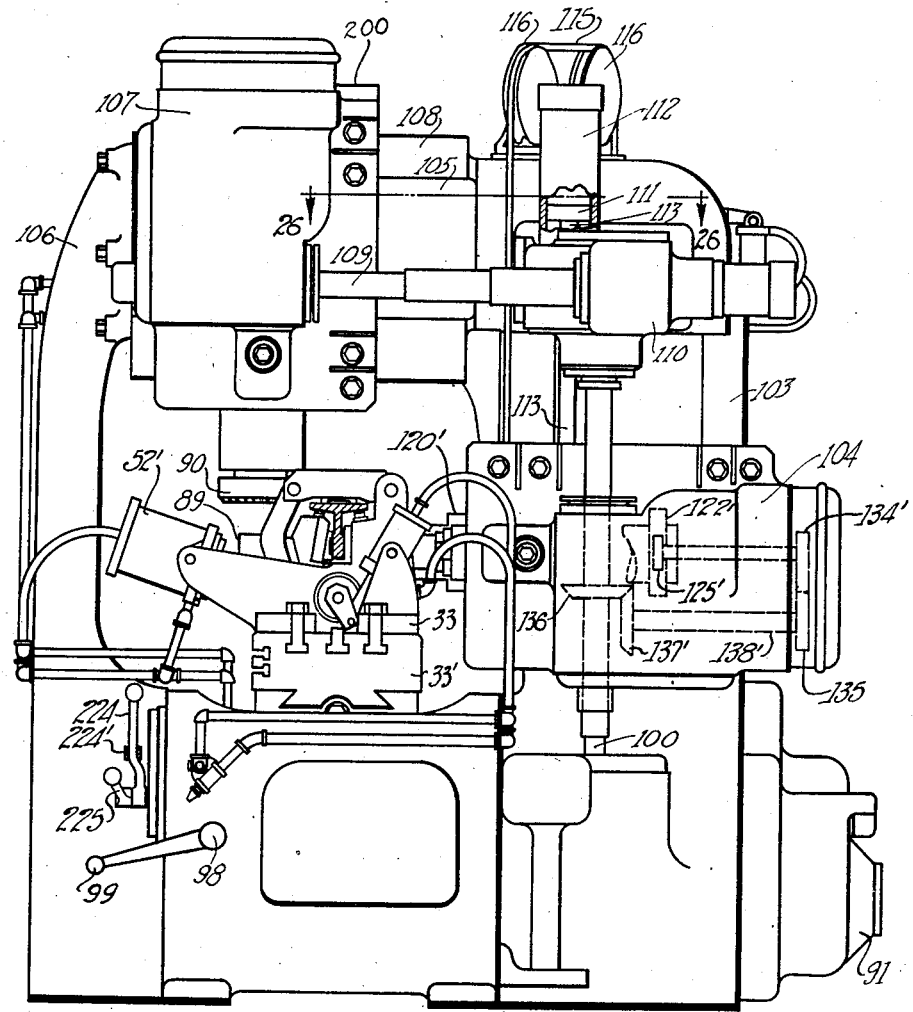
Figure 2 is an elevation of one of the units as viewed on the line 2—2 of Figure 1.

Each unit is provided with a horizontal spindle and a vertical spindle which are mounted in separate carriers and adapted to be driven from a prime mover located in the base of the unit. As shown in Figure 2, the spindles are provided with cutters, such as 89 and 90, and the prime mover, such as 91, for rotating them is located in the base of the unit. It is to be noted that the spindle transmission for one unit is separate and independent of the transmission for the other unit but are the same with one exception to be described hereafter. Such a transmission is shown in Figure 18 and comprises a prime mover 91 which drives a pulley 92 journaled for free rotation on the shaft 93 through suitable means, such as the belt 94. The shaft 93 may be coupled with the pulley for actuation thereby through suitable clutch means, such as the cone clutch 95, controlled by the shifter rod 96 which is adapted to be oscillated through the crank 97 by the shaft 98 extending longitudinally of the machine and projecting from one end thereof where it is provided with an operating handle 99. The spindle driving shaft 100 is adapted to be rotated in a forward or reverse direction through bevel gearing 101 adapted to be clutched to the shaft 93 for actuation thereby through the shiftable clutch member 102.

The horizontal spindle carrier 104 is vertically movable on suitable guides on the column portion 103. A horizontal rail 105 is secured to the top of this column and provided with an outboard support 106. The rail has suitable guides 108 for supporting thereon the vertical spindle carrier 107. The spindle 120' in the horizontal carrier is adapted to be driven from the shaft 100 through a bevel gear 136 splined thereon but fixed with the carrier which in turn actuates a gear train comprising the bevel gear 137' meshing with the gear 136 and secured to the end of a shaft 138' which drives, through change speed gears 134'—135', a parallel shaft having a pinion 125' meshing with the bull gear 122' on the cutter spindle. The shaft 100 extends on upward from the horizontal carrier to the gear box 110 and through bevel gears 100' mounted thereon, as shown in Figure 26, actuates the horizontal drive shaft 109 extending to the vertical carrier 107. The vertical spindle is rotated through gearing similar to that described for the horizontal spindle. As both spindles are simultaneously driven from the same source of power, the clutch 95 controlled by the lever 99 serves as a common clutch to determine their actuation.

Figure 8:
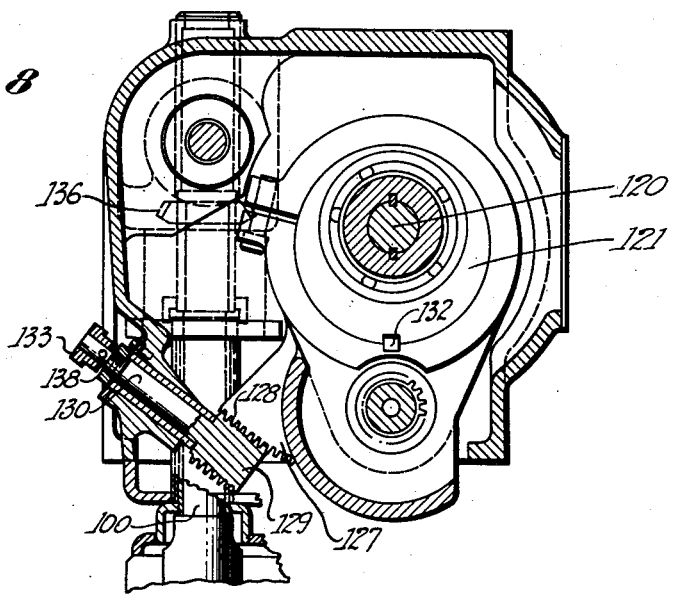
Figure 8 is an end view, partly in section, of the laterally adjustable cutter spindle used on the forward unit.

The transmission to the spindles of unit B is similar to that just described for unit A with the exception that the horizontal spindle carrier is provided with an eccentric quill adjustment whereby the wear of the cutters caused by regrinding may be taken up to maintain the same spacing between the horizontal cutters and thereby produce the same length of work pieces. As shown in Figures 8 and 10 the horizontal cutter spindle 120 is rotatably mounted eccentrically in its quill 121. The driving gear 122 is keyed to the end of the cutter spindle and driven from the pinion 123, integral with the shaft 124 journaled in a fixed part of the horizontal carrier, through the gear couplet 125—126 which mesh respectively with the gears 122 and 123. The gear couplet is journaled in an independent oscillatable housing 127 having a quadrant 128 formed on the exterior thereof with which the worm 129 secured to the end of the shaft 130, journaled in the fixed part of the carrier, meshes. The housing 127 is pivoted on the journal portion 131 and is also keyed to the quill 121 by means of the key 132 whereby upon rotation of the worm 129 by its manual adjuster 133, secured to the end of the shaft 130, the housing 127 will be rotated on its journal and carry with it the eccentric quill 121, which is rotatably mounted in the carrier, together with the gear pair 125—126. By this construction it is possible to maintain at all times a driving connection between the fixed gear 123 and the eccentrically adjustable gear 122, it being apparent that the axis of the gear couplet 125—126 is always the same distance from the axis of the spindle due to the fact that the gear couplet moves with the eccentric sleeve which thereby prevents any variation in the distance between them.

The shaft 124 has secured thereto the gear 134 meshing with the gear 135 which is driven from the spindle shaft 100 through bevel gears 136—137.

The quill adjusting shaft 130 may have secured to the exterior end thereof an indicator plate, such as 138, for visibly indicating the amount of adjustment effected.

Spindle carrier traversing mechanism

Since the spindle carriers of each unit are traversed by similar mechanism having the same hydraulic transmission and control system, the description thereof will be confined to one unit, it being understood that the carriers of the other unit are similarly actuated and controlled.

The horizontal spindle carrier 104 is adapted to be moved up and down by hydraulic means comprising a piston 111, as shown in Figure 2, slidably mounted in a cylinder 112 and having a piston rod 113 attached to the upper portion of the carrier. The carrier may be counterbalanced as by means of a counterweight 114 attached to the end of a cable 115 passing over sheaves 116 and secured at the other end to the carrier. The vertical carrier is adapted to be translated on the horizontal ways 108 by a piston 117, shown more particularly in Figure 26, reciprocably mounted in the cylinder 118 and having a piston rod 119 attached to the carrier. By admitting pressure to these cylinders in an approved manner, hereinafter set forth, movement of either carrier in a desired direction may be effected.

Common control for work holders and carriers

As previously described, the work fixtures of the machine as a whole are under the common control of the valve 66 and this valve also serves to set into operation the automatic cycle of the carriers of both units. This is accomplished by providing a starting cylinder for each unit, such as 139 and 140, which cylinders are connected to the fluid system that controls the work holders and are simultaneously operated therewith. Upon the admission of pressure by the control lever 67, the cylinders 139 and 140 are slower to operate than the work clamping cylinders due to the greater resistance to be overcome by them. This time lag insures that the work will be securely clamped before the machining cycle commences.

Hydraulic transmission and control mechanism for the carriers of one unit

It should be noted at this point that although the cylinders 139 and 140 are connected together for simultaneous operation, the hydraulic circuits controlled thereby are separate and distinct for each unit. One of these circuits is diagrammatically illustrated in Figure 6 and the elements thereof comprise, broadly, three pumps, a variable delivery pump 141, a booster pump 142, and a rapid traverse pump 143, having in conjunction therewith a standard selector valve 144 which determines the rate and direction of movement of the part to be hydraulically actuated and a stop valve 145, all of these parts comprising a known hydraulic system which is common to all the carriers to be operated thereby but which are separately connected therewith for actuation one at a time. The carriers have operating cylinders 112 and 118, previously described, which are adapted to be connected to the standard selector valve 144 through the unit selector valve 146. From the diagram it will be seen that the unit selector valve spool 146' is shifted to the right and thus couples the horizontal carrier cylinder 112 with the standard selector valve through cannelures 230 and 231 while if moved to the left it would connect the vertical carrier cylinder 118 with the standard selector valve.

The shifting of this unit selector valve is automatically controlled by separate prepositioning valves 147 and 148, one being mounted adjacent to each carrier and in turn being operated by control valves 149 and 150, respectively, which are mounted adjacent to the opposite carrier and dog operated therefrom. For instance, the valve 149 adjacent the vertical carrier controls the prepositioning valve 147 adjacent the horizontal carrier and the control valve 150 adjacent the horizontal carrier controls the prepositioning valve 148 adjacent the vertical carrier. This makes it possible to control the starting of one carrier from the movement of the other. Separate pilot valves 151 and 152 are coupled with each carrier for controlling the rate and direction of movement thereof and each is adapted to be selectively connected with the standard selector valve 144 simultaneous with the connection of its carrier cylinder to the selector valve, by the unit selector valve. By this construction a single standard selector valve may be utilized for effecting the rate and direction of movement of either carrier which is determined by a separate pilot valve coupled with each carrier. This makes it possible for each carrier to have its own cycle of movement and by use of the prepositioning valves the cycle of one carrier may be interrupted at any point to permit the other carrier to pass through a portion or all of its cycle after which the remaining portion of the first carrier's cycle may be completed.

Having thus briefly described the elements of the hydraulic system the construction and operation of the pilot valves will now be explained. Referring more particularly to Figures 7, 19, 20 and 21, each pilot valve 151 and 152 has a plunger 153 and 198 respectively, which are mounted in the respective valve bodies for oscillation and reciprocation to determine the positioning of the standard selector valve 144 and thereby the movements to be imparted to the carrier, oscillatory movement effecting a change of rate in movement of the carrier, as from feed to rapid traverse, while a longitudinal shift in one direction effects a change in both rate and direction of movement and in the opposite direction will stop the movement of the carrier. This may be termed a one-way cycle in that the part controlled thereby makes one reciprocation and then stops. When the machine is stopped and all the parts are in their starting position it is apparent that both pilot valves must be in a stopped position and it is, therefore, necessary in order to start a cycle that external means be provided for moving one of these pilot valve plungers to an operating position. It is for this purpose that the starting cylinders 139 and 140, previously referred to, are provided.

Figure 7:
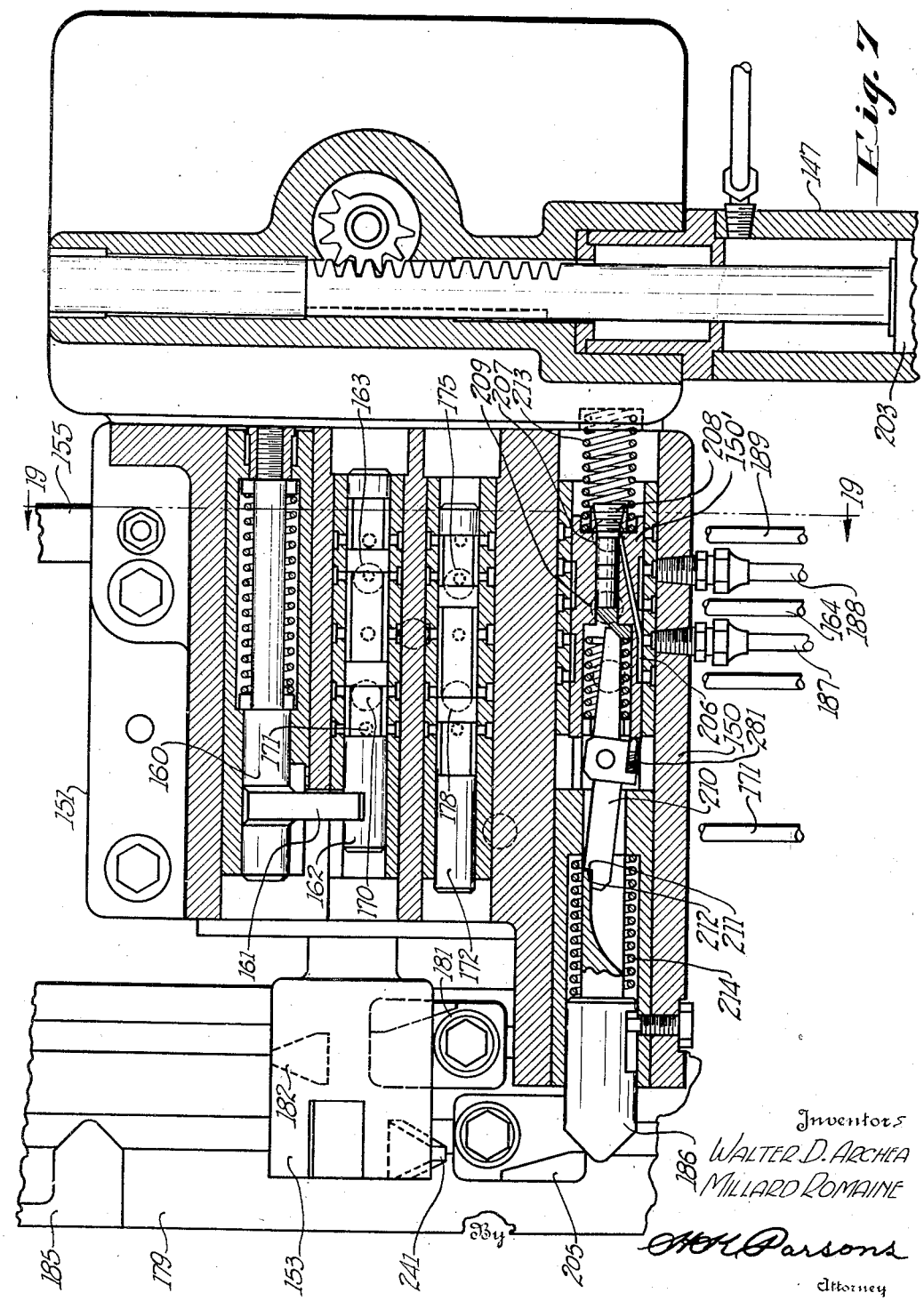
Figure 7 is a detail, partly in section, of the pilot valve and prepositioning control valve provided with each movable slide.

As more particularly shown in Figure 3, the cylinder 139 for unit A has a piston 154 which is connected through the piston rod 155 to a starting lever 157 reciprocably mounted in the pilot valve body 158. The starting lever has a slot 234 formed therein for receiving the pin 233 resiliently mounted in the end of the arm 232 integral with the plunger whereby downward movement of the lever to the position shown in Figure 19 will cause a clockwise oscillatory movement of the pilot valve plunger 153. The plunger will in turn cause movement of the standard selector valve, through connections to be described, from a stop position to a rapid traverse forward position, thereby causing the particular carrier connected therewith to begin moving at a rapid traverse rate and thus initiating the automatic cycle of the unit. This clockwise movement of the plunger rotates the bell crank 159 due to the integral projection 183 thereof extending in the groove 184 of the plunger 153. As shown in Figure 20, this crank has a ball ended lever 235 projecting in a socket 236 of a valve operating plunger sleeve 160' to effect longitudinal movement thereof. The valve operating plunger 160 slidably mounted in the sleeve, as shown in Figure 7, has an integral arm 161 engaging a recess on the reciprocable valve spool 162 which is shifted to the position shown in Figure 7 by rotation of the pilot valve. The actual shifting of the valve spool 162 is accomplished by a load and fire mechanism comprising a pair of spring pressed detents 260 and 261 either of which is adapted to engage a slot 262 in the plunger 160 and each having beveled shoulders 263 for engagement with similar shoulders 264 in the sleeve. Upon movement of the sleeve by the bell crank a detent engaging slot 262 prevents simultaneous movement of the plunger. A spring 265 surrounds the plunger 160 between a pair of shoulders thereon and is also engaged at opposite ends by a portion of the sleeve 160' whereby upon movement of the sleeve in either direction the spring will be compressed until engagement between a pair of beveled shoulders as 263—264 causes withdrawal of the detent and a shifting of the valve. This effects connection of the channel 163, which leads to the left end of the standard selector valve 144 through cannelure 237 of the unit selector valve, with the pressure channel 164 to cause shifting of the selector valve to the right by means of the small operating cylinder 163' thereby coupling the channel 165 from the rapid traverse pump 143 with the channel 166 leading to one end of cylinder 112 and coupling the return line 167 from that cylinder to the return channel 168 leading to the reservoir 169 in the base of the machine. The valve plunger 162 also connects the channel 170 returning from the operating cylinder 170' at the right end of the selector valve through the cannelure 238 to the return channel 171 thereby permitting the valve to shift. The starting cylinder 139 thus functions to rotate the pilot valve plunger from a stop position to a rapid traverse position and since the cylinder 112 is coupled with the horizontal spindle carrier, this will cause that carrier to move downward at a rapid traverse rate.

It will be noted that the standard selector valve spool is shifted longitudinally by hydraulic pressure acting in small operating cylinders 163' and 170' and that the pilot valve serves to control this power shifting medium whereby only a small force is necessary to dog actuate the pilot valve, while the pilot valve in turn controls a large force necessary to shift the selector valve.

A second reciprocable valve member 172 is provided in the pilot valve body and adapted to be actuated upon reciprocation of the pilot plunger 153 by a second valve operating plunger 173 having an integral arm 174 engaging a slot in the valve member 172 similar to the previous valve 160. This valve controls the rotational movement of the standard selector valve 144 and at the beginning of the cycle and during the rapid traverse movement of the carrier just described, is in a position to the right of the position shown in Figure 7 in which position it connected the channel 175 to the pressure channel 164 and the channel 178 with the return line 171. The channel 175 leads to the small operating cylinder 176 of the selector valve through cannelure 239 of the unit selector valve to effect clockwise rotation and the channel 178 leads to the operating cylinder 177 of the selector valve by means of the cannelure 240 to effect counter clockwise rotation of the selector valve.

Figure 5:
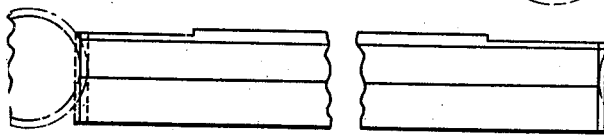
Figure 9:
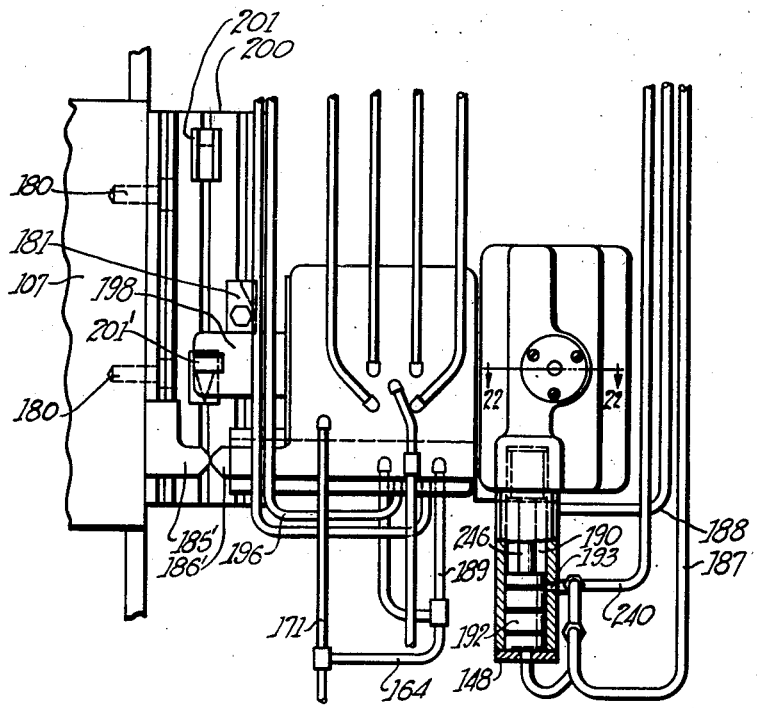
Figure 9 is a plan view of the valve structure accompanying the vertical spindle carrier.

As shown more particularly in Figure 9, each carrier is provided with a T-slotted plate secured to the rear thereof as by means of screws 180 for the purpose of carrying control dogs for operating the pilot valve plunger. In the present instance, the carrier 104 is moving downward at a rapid traverse rate and as it nears the work the rate should be changed to a feed rate to permit the cutters to operate. For this purpose a dog, such as 181, is secured to the plate 179 attached to the carrier 104 for engaging the projecting lug 182 of the pilot valve plunger to shift the plunger longitudinally outward to the position shown in Figure 7. This shifting of the plunger 153 effects longitudinal movement of the valve member 172 through its operating plunger 173 to the position shown in Figure 7, attention being invited to the fact that this longitudinal movement of the valve plunger does not effect the valve member 162 because the lug 183 simply slides in the longitudinal slot 184 of the plunger 153. This movement however, causes the pin 233 to withdraw from its slot 234, since the pin extends parallel to the axis of the plunger 153. Withdrawal of the pin permits the plunger to be rotated on its next movement without interference. It will be seen that after this rotation, the pin will not register with the slot 234, so that upon a subsequent longitudinal movement of the plunger the pin will engage the periphery of the starting lever but since the pin is resiliently mounted, it will not hinder the rotary movement of the plunger. The starting lever will not return to its original position until the pressure is released from the work holders which is after the completion of the machine cycle. Upon return of the starting lever, the pin 233 will snap into the slot 234 in position to start the carriers upon another cycle of operation. This movement of the valve 172 to its left position disconnects the channel 175 from the pressure channel 164 and connects it to the exhaust channel 171 while at the same time disconnecting the channel 178 from the exhaust channel 171 and connecting it to the pressure channel 164. Fluid pressure will now flow to the selector valve operating cylinder 177 to rotate the selector valve in a counter clockwise direction which will in turn disconnect channels 166 and 167 from the channels 165 and 168 and connect them with the channels 183' and 184', as shown in Figure 27, or in other words, disconnect the cylinder 112 from the rapid traverse pump 143 and connect it with the feed pump 141 thereby changing the rate of movement of the horizontal carrier from a rapid traverse to a feed rate. In this position of the selector valve it will be noted that the rapid traverse pump is short circuited thereby obviating the possibility of excessive pressure building up in the pump and overheating it. The cutter now feeds downward to mill off the end of the work which operation is shown diagrammatically in Figure 5, the cutter of one unit being formed to mill a small vertical groove and of the other unit to mill a slight projection of complementary shape.

Attention is invited to the fact that it is during this downward movement of the carrier of unit B that the member 83 engages the arm 69 to move the stop 19 out of the way of the descending cutter, as previously described in connection with Figure 12.

Figure 4:
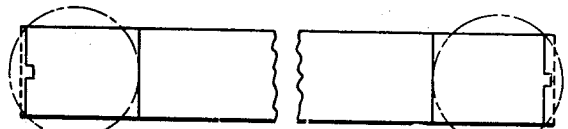
Figures 4 and 5 are views diagrammatically showing one series of operations that may be performed upon a work piece in a single automatic cycle by the means disclosed in this invention.
Figure 6:
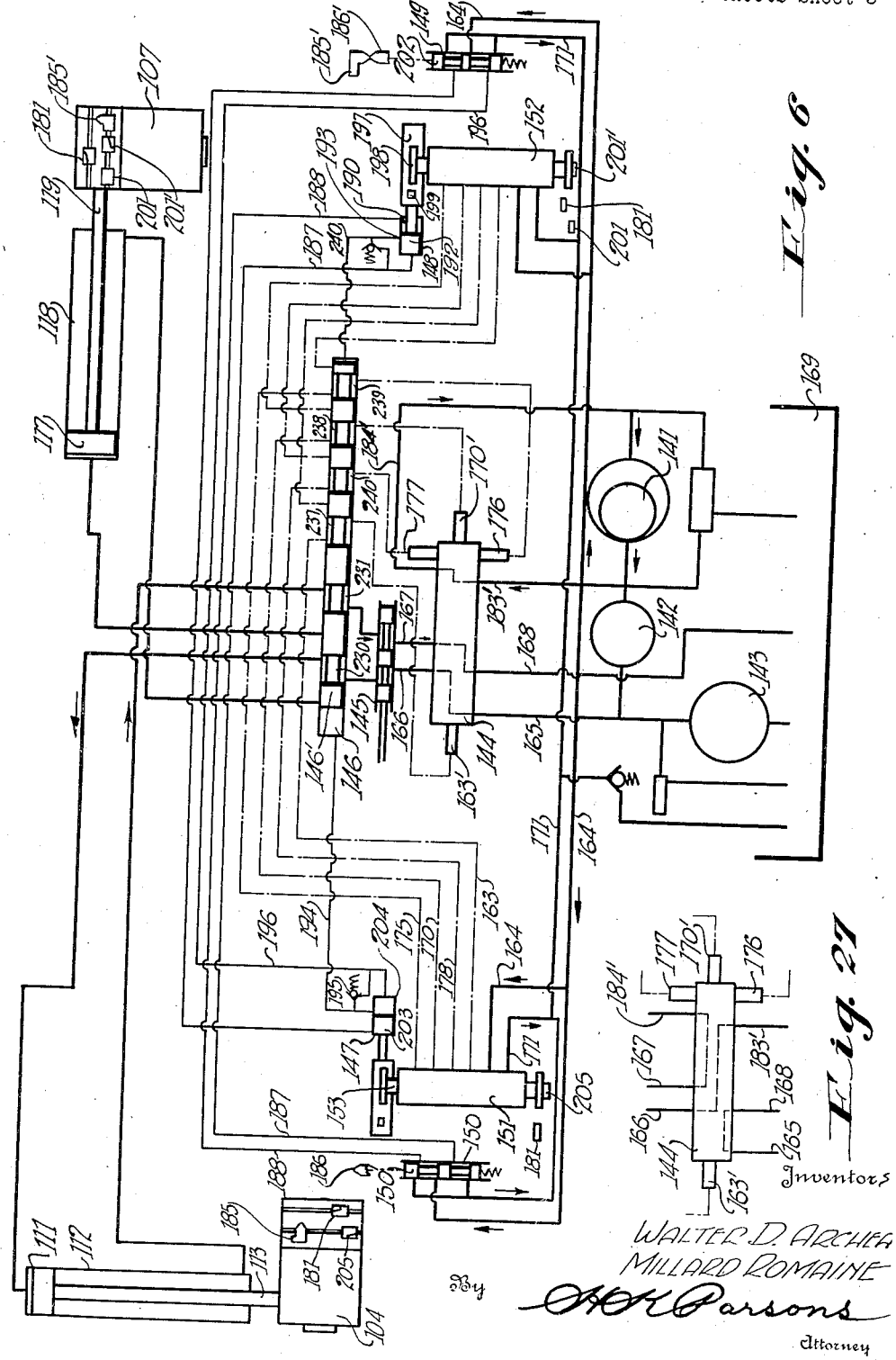
Figure 6 is a diagram of the hydraulic circuit for controlling the movable slides of one unit.

At the completion of the cut the horizontal carrier 104 remains in a lowered position while the vertical carrier is traversed laterally to perform the operation diagrammatically illustrated in Figure 4. This transition or shifting of the actuating power from one carrier to the other is effected by a stop dog 185 which is also attached to the plate 179 of the carrier 104 for engaging the plunger 186 of the prepositioning control valve 150. The dog 185 and plunger 186 are in a different plane from the pilot valve plunger and control dogs and, therefore, the dog 185 may pass the pilot valve plunger without interference therewith. The dog 185 moves the plunger 186 to the right which, through a shoulder 212 formed thereon and engaging member 210, forces the valve member 150' to the right. This disconnects the channel 188 from the pressure channel 164 and connects it with a branch line 189 leading to the return channel 171. As shown in Figures 6 and 9, the channel 188 is connected to the upper chamber 190 of the prepositioning valve 148 adjacent carrier 107 and, by connecting this channel with the outlet it permits upward movement of the prepositioning valve piston 192 upon the admission of pressure to channel 187 from channel 164 which is simultaneously effected by movement of the control valve. The prepositioning valve piston 192 will continue to move upward until the port 193 is uncovered at which time the pressure will continue its flow to the right end of the unit selector valve 146 through channel 240 thereby shifting the unit selector valve to the extreme left. This is possible as the fluid in the left end of the unit selector valve will be exhausted through the channel 194, check valve 195 and channel 196 to the other control valve 149 which remains in a position to connect channel 196 with the exhaust channel 171.

It should be noted at this point that the movement of the unit selector valve from its right hand position to a left hand position completely transfers the standard selector valve and pumps connected therewith from one hydraulic circuit having an hydraulic motor and pilot valve for controlling it, into another hydraulic circuit having a second hydraulic motor and individual pilot valve for the control thereof. In other words, this transition simultaneously disconnects the cylinder 112 and its pilot valve 151 from each other, as well as from the standard selector valve resulting in the horizontal carrier stopping and at the same time connects the cylinder 118 of the vertical carrier 107 with the standard selector valve 144, as well as connecting it for control by its pilot valve 152. This pilot valve has been in a stop position since the beginning of the cycle but upon movement of the prepositioning valve piston rod 246 a prepositioning slide 197 is actuated to rotate the second pilot valve control plunger 198 into a rapid traverse forward position by means of a dog 199 secured to the slide 197. This pilot valve 152 is similar in construction to the valve 151 and a description of its portings is not deemed necessary.

Attention is directed here to the fact that in addition to the dogs on the carrier movable relative to one end of a pilot valve plunger for effecting actuation thereof, there are other dogs mounted on a prepositioning slide adjacent the opposite end of the plunger and movable relative thereto whereby the plunger may be tripped at either end. This slide is actuated by hydraulic means controlled by a valve adjacent another carrier, as just described. The advantage of this construction is that a stationary spindle carrier, such as 107, may be started at any point in the travel of a movable carrier, as 104, and by dogs carried by the latter. The mechanism for actuating the prepositioning slide 197 from the piston 192 is illustrated in Figures 22 to 24 inclusive. An elongated pinion 245 meshes with rack teeth formed on one side of the piston rod 246 similar to that shown in Figure 7, whereby it is rotated upon movement of the piston rod. A pair of slide actuators 247 and 248 are slidably mounted upon opposite sides of the pinion and have rack teeth meshing therewith so that upon rotation of the pinion in a given direction the actuators will move in opposite directions. A pawl 249 pivotally mounted in a recess in the rear of the slide 197 serves to connect the slide 197 with either actuator for movement therewith. The pawl has two lugs 250 and 251 adapted to engage respectively recesses 252 or 253 in actuators 247 and 248. In Figure 22 the lug 251 engages recess 253 which will cause the slide 197 to be moved by the actuator 248 in the direction indicated by the arrow in Figure 23. Since in the present instance it is only desired to move the slide 197 once during the cycle of the unit the pivoted pawl 249 is held in engagement with the actuator 248 by means of the shifter plunger 254 having a tapered end wedged under the pawl to hold it into engagement with the actuator. This plunger has a loose sleeve 266 slidably mounted on a reduced portion thereof with rack teeth formed longitudinally thereof meshing with a segmental gear 267 integral with the pivoted lever 268. A spring 269 is interposed between the sleeve and the head of the plunger. The lever 268 is rotated to a position to cause permanent pressure to be exerted on the spring by the sleeve and thereby hold the plunger in wedging position by a fixed pin 270. If it is desired, however, to move the slide in both directions the pins 270 and 271 are removed and then upon upward movement in the direction of the arrow the pivoted lever 272 at the other end of the slide similar to 268 will ride by a fixed pin 273 and be pushed outward by the spring plunger 274 whereby upon return of the slide, the roller 275 in the end of the lever will engage the fixed pin and rotate the segment 276 thereby exerting pressure through sleeve 277 and spring 278 which will cause the wedge shaped head 279 to tend to wedge the pawl upward but the pawl will not move until it reaches the opening 280 at which time it will be snapped into connection with the actuator 247 and thereby disconnected from actuator 248. It will be noted that the spring is under maximum tension when the slide is in a center position. Since the slide is now connected with the actuator 247, it will move in the opposite direction upon the next admission of pressure to the prepositioning valve and this time the pivoted segment member 267 will operate to move plunger 254 under the pawl upon return of the slide to reverse the connection. From this it will be seen that the slide may be moved alternately in opposite directions, thereby permitting different dog set-ups to be made which will not interfere with one another.

A T-slotted plate 200, similar in construction to the plate 179, is secured to the rear of the carrier 107, as shown in Figure 9 and has similar dogs thereon, such as 181, to change the rapid traverse movement of the cutter to a feed movement upon the cutter approaching the work, as well as a reversing dog, such as 201, for rotating the pilot valve plunger which thereby effects reversal in the movement of the piston, as well as a change in its rate of movement. In the present instance the rate will change from feed forward to a rapid return for returning the cutter to its starting position. Upon return of the carrier a second dog 201' carried thereby will engage the pilot valve plunger and slide it longitudinally to a stopped position and simultaneously therewith a stop dog 185', similar to the one shown at 185, will engage a second prepositioning control valve plunger 186' to shift the valve member 202 from the position shown in Figure 6 thereby connecting the channel 196 with the pressure channel 164 which will move the piston 203 of the prepositioning valve 147 to the left causing it to uncover the port 204 which will admit pressure to the channel 194 and shift the unit selector valve to the right or back to the position shown in Figure 6, all in a manner similar to that described in connection with control valve 150 in Figure 7.

From this it will be seen that the vertical carrier has been traversed across the work piece and returned while the horizontal carrier remained in a lowered position and upon completion of the operation has shifted the unit selector valve to again couple the pilot valve 151 with the standard selector valve 144 for controlling the operation of the horizontal carrier. It will be recalled that the pilot valve 151 was left in a feed position at the time that it was disconnected from the standard selector valve and that the horizontal carrier was moving downward. This last movement of the unit selector valve recouples the pilot valve 151 with the standard selector valve and also with the horizontal carrier. This would cause the horizontal carrier to resume its feed movement downward but the prepositioning valve piston 203 upon movement to the left, as shown in Figure 6, also reciprocated the pilot valve plunger 153 thereby shifting the standard selector valve to a rapid return position whereby the horizontal carrier instead of feeding downward is rapidly traversed upward to its starting position. Upon attaining this position a stop dog, such as 205, engaging a lug 241 on the plunger 153 moves the plunger to a stop position and thereby stops the movement of the carrier.

The control valve, shown in Figure 7, is returned to normal position after the channel 187 has been connected with the pressure channel 164 by the means of pressure gradually leaking through the channel 206 into the space between the movable piston 207 and the plug 208 fixed in the end of the valve 150. When the pressure finally builds up to a maximum the piston 207 will gradually move to the left and by means of its beveled face 209 will rotate the pivoted arm 210 which in turn will cause the latch 211 to move downward from the shoulder 212 formed on the reduced end portion of the plunger 186. This will permit the valve member 150' to be moved by the pressure from the spring 213 toward the left thereby re-setting the control valve even although the dog 185 is still in engagement with the plunger 186. A spring 214 surrounds the plunger 186 and will return it to normal position causing the spring 281 to re-set the trip arm 210 upon recession of the dog 185.

Upon return of the valve member 150' it will assume the position shown in Figure 6 thereby connecting the channel 188 with the pressure channel 164 causing pressure to build up in chamber 198 which will move the piston 192 downward and close off the port 193 thereby trapping fluid in channel 240 to hold the unit selector valve in its shifted position. It should thus be apparent that the prepositioning control valve functions to position the pilot valve of the particular slide to be moved, as previously described, subsequently causing a surge of pressure to shift the unit selector valve thereby connecting up the pilot valve with the rate and direction selector valve 144 and lastly, by the automatic return of the control valve, causes the prepositioning slide to return to its starting position by means of piston 192.

The stop valve 145 which is interposed between the standard selector valve 144 and the unit selector valve 146 is provided with a valve spool plunger 215 which is surrounded by a spring 216 interposed between a fixed abutment 217 and a collar 218 secured to the plunger whereby the valve spool is normally held in a stop position. The plunger rod is extended and provided at its outer extremity with an indent 219 which receives the rounded head of a crank arm 220 keyed to the stub shaft 221 journaled in the front wall of the machine and projecting from the exterior thereof. A pivoted latch member 222 engages a detent 223 formed in the plunger rod for retaining it against the action of the spring 216 and thereby holding the stop valve in a position to permit actuation of parts controlled thereby without the necessity of manually retaining the valve in open position. The arm 220 is provided with a lug 226 which by means of a link 227 is connected to a lug 228 integral with the pawl 222 whereby clockwise movement of the arm will effect unlatching of the pawl permitting the stop valve to return to a closed position under the action of the spring 216.

The shaft 221 is provided with two operating handles 224 and 225. The handle 225 is secured directly to the shaft as by a pin 225' while the arm 224 is freely mounted on the shaft. Each handle is provided with a bushing having clutch teeth extending therefrom, there being a fixed amount of lost play between them sufficient to permit operation of handle 225 to open or close the stop valve without disturbing handle 224. This handle is connected by means of a connecting link 224' to a similar handle on the other unit whereby the link 224' may be utilized to stop the operation of units simultaneously or if so desired, either unit by means of an individual handle 225 may be stopped without stopping the other. This increases the flexibility of the machine control.

The description of the machine has been illustrated in connection with milling off the ends of a single piece of work but it will be understood that short lengths of work may be secured, one in each work holder for simultaneous operation thereon, or a short length of work may be machined in one unit while the other unit is idle. For this purpose separate stop valves, such as 285 and 286 are provided to prevent operation of the automatic cycle of its particular unit.

The operation of the machine in general will be briefly summarized. Assuming the transfer table 10 in an elevated position and the work fixtures of each unit open, the work is passed successively through the work fixture in unit A, and the guide rollers 14 onto the rollers 16. It is thus supported and rolled along these rollers until the forward end of the work has passed through the open work fixture in unit B and engaged the positioning stop 19 which locates the work longitudinally with respect to the cutters of each unit. Control lever 31 is now operated to lower the transfer table 10 and thereby the work into the fixtures. Control lever 67 is then operated to automatically clamp the work in both fixtures and simultaneously start the automatic cycle of each unit. The levers 99 have previously been actuated to rotate the cutters of each unit. In the present instance the cycle of each unit is the same but it will be understood that each unit may be set up for a different cycle without interfering in any manner with the control of the machine in general. During the cutting cycle the operation of either unit may be stopped by means of an individual control lever, such as 225, without interference with the other unit, or both units may be stopped and started by means of the joint control lever 224'.

By the reverse operation of control levers 67 and 31 the work is unclamped, elevated and removed from the machine by continuing its movement through the work fixture in unit B, thus making it possible to introduce the work into one end of the machine and remove it from the other end.

From the foregoing description taken in connection with the accompanying drawings, it should now be evident that a machine has been provided which is composed of a plurality of units, each unit having a plurality of slides which may be selectively actuated and controlled automatically by a single member to the end that tooling operations incapable of simultaneous performance may be effected in quick succession in one cycle of the machine without loss of time between the operations. In addition, the units may be individually or simultaneously started and operated by means of suitable controls for effecting either mode of operation, the controls being so arranged that during simultaneous operation either unit may be stopped and started without interfering with the operation of the other.

That which is claimed is:

1. A metal working machine having a plurality of units, each unit comprising a work support, a plurality of translatable spindle carriers, a common rate and direction determinator for said carriers, and a plurality of controls for said determinator, there being one for each carrier, and means to selectively couple any carrier and its control with said determinator.

2. A machine tool organization having multiple slides, power actuating means therefor, a single rate and direction determinator interposed between the power means and said slides, means for selectively coupling the determinator with any slide, multiple control means for said determinator, there being one control means for each slide, and means to simultaneously couple the respective slide control means with said determinator upon coupling of the slide therewith.

3. A milling machine having a support and a column, a work table mounted on the support, a plurality of slides mounted on the column for movement relative to the work table, hydraulic means for actuating the slides alternately during a single cycle, and hydraulically actuated control means for initiating movement of a stationary first slide automatically from a moving second slide, or reciprocally, of a stationary second slide from a moving first slide.

4. A machine tool having a work support, a plurality of hydraulically actuated tool carrying slides adapted to be moved with respect to said support, a source of hydraulic pressure, a single valve means to selectively couple any slide with said source for movement thereby, means dog actuated by the moving slide for shifting said valve means to disconnect the moving slide and connect a stationary slide with said power means whereby the termination of movement of one slide initiates the movement of a second slide.

5. A machine tool having a fixed support, a plurality of slides adapted to be successively translated with respect to said support, common hydraulic actuating and rate and direction control means for said slides, and a single valve to selectively connect either of said slides with said actuating and control means for operation thereby.

6. In a machine tool having a work support and multiple hydraulically actuable tool slides mounted for translation with respect thereto, a common hydraulic actuating means for said slides, individual dog actuated control means for said common actuator coupled with each slide, and a single valve to selectively couple a slide and its control means with said common actuator to thereby effect movement of the selected slide through a cycle determined by its individual control means.

7. In a machine tool organization a pair of spaced milling units, a transfer table intermediate said units, a work holder associated with each unit, said transfer table being adapted to receive and support a work piece to be finished by said units, means for lowering the table to place spaced parts of the work piece in said work holders, independent means for securing the work in each work holder for simultaneous operation on the spaced parts thereof by the respective units, and means to elevate the table to remove the work piece from the machine.

8. In a machine tool, a pair of spaced metal working units, a support interposed therebetween, rollers on said support for conveying work into the machine, an abutment for positioning work with respect to said units for operation thereupon, automatic means effective during said operation for removing the abutment from the path of the work, and means actuated by movement of the work from the machine to replace the abutment for positioning a subsequent work piece.

9. A metal working organization comprising a battery of milling units, each unit capable of performing an automatic cycle of operations and stopping at the end of the cycle, a single control for initiating movement of all of said units simultaneously, and an additional control for interrupting the movement of all of said units simultaneously.

10. A metal working organization comprising a battery of milling units, each unit capable of performing an automatic cycle of operations and then stopping at the end of the cycle, a single control for initiating movement of all of said units simultaneously, an additional control for interrupting the movement of all of said units simultaneously, and individual control means respective to each unit for interrupting the cycle of movement thereof.

11. A metal working organization comprising a battery of milling units, each unit having a plurality of cutters, individual power means for effecting rotation of the cutters of each unit, a work holder for each unit, fluid means for operating the work holders of all of the units, separate hydraulic means for translating the cutters of each unit relative to the work holders thereof, a unitary starting lever for coupling the fluid means with the work holder and the hydraulic means to the cutters, and additional individual control means coupled with each unit for determining the subsequent actuation of the movable parts thereof.

12. A milling machine having a plurality of hydraulically actuated slides, a pilot valve coupled with each slide for determining the actuation thereof, and remote control means coupled with each slide and effective upon the pilot valve of a remote slide to initiate movement thereof whereby any stationary slide may be started by remote control means from a moving slide.

13. A milling machine having a plurality of translatable slides, individual hydraulically actuated means for effecting translation of each slide, a separate pilot valve coupled with each of said means for determining the rate and direction of movement of each slide, an hydraulically actuated prepositioning slide associated with each pilot valve and having dog control means for determining the setting thereof, a dog actuated remote control valve therefor associated with another slide, a source of pressure, means for coupling a prepositioning slide for actuation by said source upon dog actuation of its control valve to determine the subsequent movement of a stationary slide.

14. A machine tool having a plurality of hydraulically actuated slides, a source of pressure, a unit selector valve shiftable to couple either slide with said source for actuation thereby, and means dog actuated by a moving slide to shift said selector valve to couple a stationary slide with said source for subsequent actuation thereby.

15. A machine tool having a plurality of slides, hydraulic means for selectively actuating said slides, manual means for initiating movement of one of said slides by said hydraulic means, control means subsequently operated by the moving slide for terminating movement thereof during its cycle and initiating movement of a second slide by said hydraulic means, and additional control means operable by said second slide at the completion of its cycle to terminate movement thereof and initiate movement of the first slide to complete its cycle of movement.

16. A transmission and control mechanism for a machine tool having a plurality of slides, individual hydraulic motors for effecting translation thereof including a piston and cylinder, one of which is attached to the slide, a source of hydraulic pressure, a common rate and direction control means therefor, means to selectively couple either motor with said rate and direction control means and said pressure for actuation thereby, a common stop valve, and manual control means therefor whereby the movement of the slide being actuated may be terminated.

17. A machine tool having a plurality of slides, hydraulically actuated means for effecting translation thereof including an individual cylinder and piston for each slide, one of which is attached thereto, a source of pressure, control means for coupling said source with said motors including a common rate and direction selector valve, a stop valve and a unit selector valve in the order recited, an individual pilot valve coupled with each slide for determining the setting of said selector valve and a prepositioning control valve coupled with each slide for effecting a shift of the unit selector valve to thereby terminate the movement of one slide and initiate movement of a second slide.

18. A milling machine having a plurality of slides, a source of hydraulic pressure, a unit selector valve positioned to couple one of said slides with pressure to effect translation thereof, a control valve adjacent the moving slide having a trip plunger, dog means carried by the slide for engaging the plunger to cause shifting of the selector valve and thereby the connection of another slide with pressure for actuation thereby, and means to reset the control valve with the plunger still in engagement with the dog means.

19. A milling machine having a plurality of carriers, hydraulic means for selectively translating said carriers including a unit selector valve, an individual pilot valve coupled with each carrier for controlling the actuation thereof when coupled with the hydraulic means, a prepositioning slide adjacent each pilot valve, dogs carried thereby, and trip control means actuable by a moving slide to effect shifting of the prepositioning slide of a stationary carrier to determine the positioning of its pilot valve, and subsequently to effect shifting of the unit selector valve to connect the stationary carrier with pressure for movement thereby in accordance with the positioning of its pilot valve.

20. A milling machine having a plurality of movable slides, hydraulic motive power therefor, valve means selectively shiftable to couple the motive power with the slides, dogs carried by each slide and movable therewith, individual trip control means associated with each slide and mounted in the path of the respective dogs for actuation thereof, and motion transmitting means actuable by said control means for shifting said valve whereby the initiation of movement of a stationary slide may be controlled from a moving slide.

21. A milling machine having a plurality of moving slides, hydraulic motive power therefor, valve means selectively shiftable to couple the motive power with any one of the slides, additional valve means interposed between the first valve means and said motive power for determining the rate and direction of the coupled slide, dogs carried by each slide, individual trip actuated control means mounted in the path of the respective dogs of each slide for actuation thereby to effect shifting of the first valve, additional trip control means associated with each slide and actuable by dogs carried thereby for actuating the second valve means whereby a moving slide may control its own rate and direction of movement and the initiation of movement of a second slide at any point in the cycle of the moving slide.

22. A machine tool comprising a pair of spaced milling units each having a work holder, means to support a work piece intermediate said unit with its opposite ends in said work holders, cutting means associated with each work holder, means to translate the cutting means relative to the work to mill the ends of the work and means for adjusting the axis of one of said cutting means relative to the other to predetermine the length of the work.

23. A machine tool comprising a pair of spaced milling units each having a work holder, means to support a work piece intermediate said units with its opposite ends in said work holders, a spindle carrier reciprocably mounted in each unit for movement transversely of the ends of the work, a cutter spindle journaled in each carrier, said cutter spindles being parallel, cutters secured to each spindle and means to adjust one spindle laterally of the other to vary the length of the work.

24. A milling machine comprising a work support, a fluid operable work holder thereon, a source of pressure therefor, a plurality of fluid operable cutter supporting slides translatable in predetermined sequence with respect to said work holder, an independent source of fluid pressure for said slides, a rotatable control member for determining pressure actuation of the slides, a fluid operable device for rotating said control member to initiate movement of the slides and a single valve means connected to the first source of pressure to effect actuation of the work clamps and of said fluid operable device.

25. A milling machine having spaced work receiving fixtures, rotatable cutters respectively associated with said fixtures, power operable means for effecting relative movement therebetween, a transfer table adapted to receive work thereon interposed between the fixtures, fluid operable means for vertically reciprocating the table to position and remove work relative to the fixtures, a source of fluid pressure, fluid actuated means for initiating cycles of relative movement between cutters and work, a first control member for selectively coupling fluid pressure to the table elevating mechanism, and a second control in parallel arrangement to the first control for coupling fluid pressure to the cutter cycle initiating means.

26. A milling machine having in combination with longitudinally spaced work holders and cutter spindle carriers associated with said work holders for power feeding movement relative thereto, of fluid actuated means for initiating said feed movement, a transfer table interposed between the work holders, fluid operable means for elevating said table whereby work may be received thereon and lowered into said holders, including a pair of reciprocable cams, an hydraulic motor for effecting reciprocation of said cams, a source of fluid pressure, a valve for selectively coupling the pressure to the motor, positive stops for limiting cam movement in both directions, means to adjust said stops and a second control valve in parallel with the first for coupling the fluid pressure to the fluid actuated feed initiating means.

27. A milling machine having in combination with spaced work receiving fixtures and hydraulically reciprocable spindle carriers movable relative to the fixtures, of a source of pressure, a control valve for coupling the carriers to said pressure to initiate a cycle of movement thereof, fluid operable means for shifting said valve, fluid operable clamping means associated with each fixture for securing work therein, a fluid operable transfer table for positioning and removing work relative to the fixtures, a second source of fluid pressure, a plurality of branch lines extending therefrom, control means in the first branch line for coupling the pressure to the transfer table operating mechanism, and control means in the second branch line for coupling the pressure to the work clamps and the carrier control valve shifting means.

28. A milling machine having in combination with spaced work receiving fixtures and hydraulically reciprocable spindle carriers movable relative thereto, of a source of pressure, a control valve for coupling the carriers to said pressure to initiate a cycle of movement thereof, fluid operable means for shifting said valve, fluid operable clamping means associated with each fixture for securing work therein, a fluid operable transfer table for positioning and removing work relative to the fixtures, a second source of fluid pressure including branched lines extending therefrom, control means in one branch line for coupling the pressure to the table elevating mechanism, control means in a second branch line for coupling the pressure to the work clamps and the carrier control valve shifting means, said spindle carrier control means having greater initial resistance to movement than the initial resistance of the work clamps whereby the latter will be operated first to insure clamping of the work before engagement of the work with the cutters.

29. A machine tool having in combination a plurality of work fixtures, power reciprocable cutter spindle carriers associated with said fixtures, fluid operable devices for initiating power movement of the carriers, said fixtures having fluid operable work clamping means, work stabilizers resiliently mounted in said fixtures, fluid operable means for clamping said stabilizers in adjusted position as determined by the work, a fluid operable transfer table for moving work to and from the fixtures, a source of fluid pressure including a first branch line, means selectively coupling the branch to the transfer table, a second branch line having means therein selectively coupling the pressure to the work clamping means, the stabilizer clamping means and the spindle carrier operating control means, said last named means having greater resistance to movement than the work clamping means whereby the work will be clamped before engagement with the cutters.

30. A machine tool having in combination a plurality of work fixtures, power reciprocable cutter spindle carriers associated with the respective fixtures, fluid operable devices for initiating power movement of the carriers, said fixtures having fluid operable work clamping means, stabilizers resiliently mounted in said fixtures, fluid operable means for clamping said stabilizers in adjusted position as determined by the work, a fluid operable transfer table for moving work to and from the fixtures, a source of fluid pressure, a first branch line extending therefrom, means in the branch for selectively coupling pressure to the transfer table, a second branch having means for simultaneously coupling the pressure to the work clamping means, the stabilizer clamping means and the spindle carrier operating control means, said last named means having greater resistance to movement than the work clamping means thereby insuring that the work will be clamped before engagement with the cutters, and additional control means in the second branch for selectively disconnecting either work clamping means from the joint control means.

31. In a milling machine having a plurality of spaced work receiving fixtures including fluid operable means for clamping work therein, the combination of power operated cutter spindle carriers associated with said fixtures including fluid operable mechanism for initiating cyclic movement thereof, a transfer table for moving work in and out of said fixtures including fluid operable actuating mechanism, additional mechanism associated with each carrier for stopping the same, a common control station for all of said mechanisms having a first control lever for determining operation of said transfer table, a second control lever for determining joint operation of said work fixtures and cycle initiating means, a pair of control levers operatively coupled in series for the second control lever for determining individual operation of the work clamps and cycle initiating means, and an additional control lever effective on said additional mechanism for jointly terminating movement of all of said carriers.

32. A milling machine having in combination with a work holder and a cutter spindle carrier movable relative thereto, of means for moving work in a given direction into said work holder, a stop for positioning the work relative to the carrier, power means for feeding the cutter relative to the work, means mounted on the carrier for automatically removing said stop during the feeding movement whereby the work may be freely removed from the work holder by continued movement in the given direction at the completion of the cutting operation, and means operable by the departing work piece to effect resetting of said stop.

33. A milling machine having in combination, a work holder, a spindle carrier movable toward and from the work holder, means for feeding a longitudinal work piece in a predetermined direction into the holder, a stop for limiting and positioning the work in the holder, means engageable by the carrier for removing said stop including an arm operatively connected to the stop latch mechanism for holding the arm and stop in an inoperative position, and means actuable by a finished work piece upon continued movement in said direction to release automatically said latch mechanism and effect resetting of the stop.

34. A milling machine for finishing the ends of longitudinal work pieces including spaced work holders, cutter spindle carriers associated with each work holder, one of said spindles being fixed relative to its associated work fixture, the other cutter spindle being mounted in adjustable relationship to the first to determine the finished length of the work including a rotatable quill, an eccentric bore in the quill for receiving said spindle, a spindle drive shaft extending parallel to the axis of the quill, and means to maintain a driving connection between the drive shaft and spindle for effecting rotation thereof in all positions of quill adjustment, and an indicator associated with said quill for determining the amount of eccentricity of the spindle.

35. A milling machine having a pair of reciprocable slides, hydraulic motors for effecting reciprocation thereof, forward and return channels extending in parallel from the respective motors, a common source of pressure, a control valve shiftable to couple the pressure selectively to the pairs of channels and means operable by the slides to determine the position of said control valve.

36. A machine tool having a pair of reciprocable slides, fluid operable motors for effecting forward and return movement thereof, forward and return channels extending in parallel to said motors, a common source of pressure, a control valve shiftable to couple either pair of channels with said pressure, and an additional valve between the source of pressure and control valve for determining the rate of movement of the selectively actuated motor.

37. A machine tool having a pair of reciprocable slides, fluid operable motors for effecting forward and return movement thereof, forward and return channels extending in parallel to said motors, a common source of pressure, a control valve shiftable to couple either pair of channels with said pressure, and an additional valve between the source of pressure and control valve for determining the direction of movement of the selectively actuated motor.

38. A machine tool having a pair of reciprocable slides, fluid operable means for effecting forward and return movement thereof, forward and return channels extending in parallel to the respective fluid operable means, a source of pressure, a control valve for determining the coupling of pressure to the different means, said valve being rotatable to determine the rate of slide movement and reciprocable for determining the direction of slide movement, fluid operable mechanism for effecting rotation and reciprocation of said valve including pilot valve means associated with each slide to effect positioning of the control valve, and load and fire mechanism associated with said valve means whereby the same may be trip controlled from said slides.

39. A machine tool having a pair of reciprocable slides, fluid operable means for effecting forward and return movement thereof, forward and return channels extending in parallel to the respective fluid operable means, a source of pressure, a control valve for determining the coupling of pressure to the different means, said valve being rotatable to determine the rate of slide movement and reciprocable for determining the direction of slide movement, fluid operable mechanism for effecting rotation and reciprocation of said valve including pilot valve means associated with each slide to effect positioning of the control valve, load and fire mechanism associated with said pilot valve means, and a trip controlled operating plunger associated with the valves of each slide.

40. A machine tool having a pair of reciprocable slides, fluid operable means for effecting forward and return movement thereof, forward and return channels extending in parallel to said fluid operable means, a source of pressure, a control valve for determining the coupling of pressure to said means, said valve being rotatable to determine the rate of slide movement, and reciprocable for determining the direction of slide movement, fluid operable mechanism for effecting rotation and reciprocation of said valve, pilot means including a pair of valves associated with each slide to effect positioning of the control valve, load and fire mechanism associated with the separate valves whereby the same may be trip controlled, a common trip controlled plunger associated with the pair of valves of each slide, said plunger being rotatable to effect rotation of the rate and direction control valve, and reciprocable to effect reciprocation thereof.

41. A milling machine having a column, independent guideways formed on the column, separate carriers mounted on each of said guideways for movement in intersecting paths, separate hydraulic motors associated with each carrier for effecting movement thereof, a common source of hydraulic pressure, a valve positionable to couple either motor with said pressure whereby only one motor may be moved at a time, individual controls associated with each motor for determining the rate and direction of movement of the coupled carrier, and means associated with the respective carriers for terminating its own movement and initiating movement of the other.

42. A machine tool having fixedly spaced parallel guideways, carriers mounted on said guideways for simultaneous movement in parallel paths, separate power means for effecting movement of each carrier including independent fluid operable devices for initiating the cycle of movement of each carrier, additional means associated with each carrier for stopping movement thereof at any point in its cycle, means to control jointly the cycle initiators, additional individual means for controlling said cycle initiators, a joint control for said stop means and additional individual controls for said stop means.

43. A milling machine having a work support, a tool carrier, hydraulically actuated means for effecting relative movement between the tool carrier and work support including a source of pressure, a rate and direction control valve, fluid operable means for variously positioning said valve to determine said rate and direction, a pilot control plunger for said fluid operable means, said plunger having trip actuable portions on one end for operation by trip members carried by the movable carrier, and an auxiliary slide, and additional trip actuable portions on the other end for engagement with trip portions carried by the auxiliary slide, and remote fluid operable control means for determining actuation of said slide.

44. A milling machine having a work support, a tool carrier, hydraulically actuated means for effecting relative movement between the tool carrier and work support including a source of pressure, a rate and direction control means, fluid operable means for positioning said valve to determine the rate and direction of said relative movement, a pilot control plunger for determining power positioning of said rate and direction means, said plunger having trip actuable portions on one end for operation by trip members carried by the movable carrier, an auxiliary slide adjacent the other end of said plunger, additional trip actuable portions carried by the auxiliary slide, hydraulic means for reciprocating said slide including a piston and cylinder, a pair of actuators, rack and pinion means for reciprocating said actuators, a pivoted pawl for selectively connecting the slide to said actuators, and means selectively positionable for alternately connecting the pawl to said actuators to effect movement of the slide in different paths and remote control means for effecting alternate reciprocation of the piston.

45. A metal working machine having a work support and a pair of tool spindles mounted on angularly related guideways, power operable means for effecting relative movement between the work support and the other spindle in a second direction, a common rate and direction determinator for both of said means, a plurality of controls for said determinator, there being one control for each of said power operable means, and means to couple any one of said power operable means and its associated control with said determinator.

46. In a machine tool having a cutting means and a work support, the combination of a fluid operable actuator for effecting relative movement in one direction between the work support and the cutting means, a fluid operable actuator for effecting relative movement in a second direction between the work support and cutting means, means to cause sequential operation of the actuators including a source of pressure, a valve for coupling the actuators individually to the source of pressure, manual operable means for coupling the source of pressure to said valve, and means controlled by the part moved by the coupled actuator to shift said valve and thereby couple the next sequentially operable actuator with the source of pressure.

47. In a machine tool having a work support, a first cutter spindle, a second cutter spindle, and cutters attached to each of said spindles, the combination of means to effect relative movement between the first cutter and work support to produce a first plane surface on a work piece, means to effect relative movement between the second cutter and the work support to produce another plane surface on a work piece in angularly related relation to the first work piece, and power operable control means to cause automatic sequential production of said surfaces.

48. In a machine tool for machining intersecting plane surfaces, the combination of separate tools for finishing each surface, power operable means for feeding one tool across one surface beginning at the intersection of said surfaces, and power operable means to move the other tool across the other surface in a direction parallel to the line of intersection.

49. In a machine tool for machining simultaneously a pair of spaced surfaces on a work piece, the combination of a work support, a pair of cutters, individual power operable means for effecting relative movement between the respective cutters and the work piece, a common control lever for connecting a source of power to each of said power operable means, and means individual to each of said cutters for stopping the relative movement between itself and the work piece.

50. In a machine tool having a work support, a first tool spindle and a second tool spindle, the combination of power operable means for producing a first cycle of relative movement between the first spindle and the work support, additional power operable means for producing a cycle of relative movement between the second tool spindle and the work support, means to prevent simultaneous operation of both of said cycles, and trip operable means including a selectively positionable dog to interrupt one cycle at any point and cause initiation of the other cycle of operation.

51. In a machine tool having a fluid operable support, forward and return channels alternately subjectable to pressure to advance and retract said support, means to supply fluid pressure thereto including a reciprocable and oscillatable selector valve for controlling the rate and direction of movement of said support, pilot control means for said valve including a first axially shiftable pilot valve for controlling reciprocatory movements of the selector valve, and a second axially shiftable pilot valve to control the oscillatable movements of the selector valve regardless of its axial position.

52. In a machine tool having a fluid operable part and a fluid control circuit therefor, the combination of a valve for connecting the circuit to the part, a pilot control valve having a trip operable plunger for conditioning said circuit, and remote control means for initiating actuation of said part including a fluid operable slide operatively connected for actuation of said plunger, and a remote control valve for controlling fluid actuation of said slide.

53. A machine tool having a fluid operable slide, a control circuit therefor including a fluid controlled selector valve for determining the rate and direction of movement of said slide, an additional valve for coupling said slide to the selector valve, control means for initiating operation of the slide including a pilot valve for controlling the fluid positioning of the selector valve, and a remotely controlled fluid operable part to connect the pilot valve for control of the selector valve; to connect the selector valve to the slide; and to condition the pilot valve and thereby pre-determine the initial position of the selector valve when connected for control by the pilot valve.

54. A machine tool having a fluid operable slide, and a fluid operating control circuit therefor including a selector valve having a plurality of positions, a control valve adjacent the slide having a trip plunger, means carried by the slide for depressing the plunger and shifting said valve to a position stopping the slide movement, and fluid operable means for resetting the control valve a predetermined time interval after shifting thereof regardless of the position of the plunger.

55. In a machine tool having a fluid operable member, a control circuit therefor including a rate and direction determinator, a remote fluid operable control for said determinator, said determinator having a first set of ports connectible for actuation of said member, and a second set of ports connectible with said remote control, and means to simultaneously couple the respective sets of ports with the respective parts whereby the remote control may determine actuation of the member through said determinator.

56. In a machine tool having a fluid operable member, a control circuit therefor including a rate and direction determinator, a remote fluid operable control for said determinator, said determinator having a first set of ports connectible for actuation of said member and a second set of ports connectible with said remote control, means to simultaneously couple the respective sets of ports with the respective parts whereby the remote control may determine actuation of the member through said determinator, means to supply fluid to the determinator for actuation of the member, and means to supply fluid to said remote control for shifting said determinator.

57. A machine tool having a first pair of relatively movable supports including fluid operable means for effecting said movement, a second pair of fluid operable supports having fluid operable means for effecting relative movement therebetween, a source of fluid pressure, a single valve means for selectively coupling said fluid operable means with said source, and means trip operable by the moving support of the first pair for shifting said valve means to terminate one of said relative movements and simultaneously initiate the other relative movement.

WALTER D. ARCHEA.
       MILLARD ROMAINE.